United States Patent
Yoshida (10) Patent No.: US 10,908,134 B2
(45) Date of Patent: Feb. 2, 2021

(54) DETECTOR FOR GAS CHROMATOGRAPHY

(71) Applicant: YOKOGAWA ELECTRIC CORPORATION, Musashino (JP)

(72) Inventor: Takumi Yoshida, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 189 days.

(21) Appl. No.: 16/261,812

(22) Filed: Jan. 30, 2019

(65) Prior Publication Data

US 2019/0250131 A1     Aug. 15, 2019

(30) Foreign Application Priority Data

Feb. 13, 2018  (JP) ................ 2018-023382

(51) Int. Cl.
    *G01N 30/64* (2006.01)
    *G01N 30/66* (2006.01)
    *G01N 30/02* (2006.01)

(52) U.S. Cl.
    CPC ............. *G01N 30/64* (2013.01); *G01N 30/66* (2013.01); *G01N 2030/025* (2013.01); *G01N 2030/645* (2013.01)

(58) Field of Classification Search
    CPC .. G01N 30/64; G01N 30/66; G01N 2030/025; G01N 2030/645
    See application file for complete search history.

(56) References Cited

U.S. PATENT DOCUMENTS 7,849,726 B2 *  12/2010  Bailey ................... G01N 30/88
                                                          73/23.36

FOREIGN PATENT DOCUMENTS

JP          H11118749 A       4/1999

* cited by examiner

*Primary Examiner* — Jamel E Williams
(74) *Attorney, Agent, or Firm* — Kenja IP Law PC (57) ABSTRACT

A detector for gas chromatography includes a manifold, a first bridge circuit, and a second bridge circuit. A first analysis flow path, a first reference flow path, a second analysis flow path, and a second reference flow path are formed in the manifold. The first bridge circuit is configured to be capable of detecting a predetermined component in a first analysis gas using the first analysis resistive body and the first reference resistive body. The second bridge circuit is configured to be capable of detecting a predetermined component in a second analysis gas using the second analysis resistive body and the second reference resistive body. The distance between the first analysis resistive body and the second reference resistive body is less than the distance between the first analysis resistive body and the second analysis resistive body.

5 Claims, 9 Drawing Sheets

DETECTOR FOR GAS CHROMATOGRAPHY

CROSS-REFERENCE TO RELATED APPLICATION

The present application claims priority to and the benefit of Japanese Patent Application No. 2018-23382 filed Feb. 13, 2018, the entire contents of which are incorporated herein by reference.

TECHNICAL FIELD

The present disclosure relates to a detector for gas chromatography.

BACKGROUND

In a known detector for gas chromatography, a thermal conductivity detector (TCD) is formed by a block-shaped manifold. For example, see patent literature (PTL) 1. When a predetermined component in an analysis gas is supplied to a flow path formed in the manifold of the TCD, a filament arranged in the flow path changes temperature due to the predetermined component in the analysis gas. Consequently, a change in potential occurs in a bridge circuit formed by the filament. The predetermined component in the analysis gas can be detected by measuring this change in potential.

CITATION LIST

Patent Literature

PTL 1: JPH11-118749A

SUMMARY

A detector for gas chromatography according to an embodiment includes a manifold, a first bridge circuit, and a second bridge circuit. The manifold has formed therein a first analysis flow path to which a first carrier gas including a predetermined component in a first analysis gas is to be supplied, and in which a first analysis resistive body is disposed; a first reference flow path to which the first carrier gas not including the predetermined component in the first analysis gas is to be supplied, and in which a first reference resistive body is disposed; a second analysis flow path to which a second carrier gas including a predetermined component in a second analysis gas is to be supplied, and in which a second analysis resistive body is disposed; and a second reference flow path to which the second carrier gas not including the predetermined component in the second analysis gas is to be supplied, and in which a second reference resistive body is disposed. The first bridge circuit is configured to be capable of detecting the predetermined component in the first analysis gas using the first analysis resistive body and the first reference resistive body. The second bridge circuit is configured to be capable of detecting the predetermined component in the second analysis gas using the second analysis resistive body and the second reference resistive body. The distance between the first analysis resistive body and the second reference resistive body is less than the distance between the first analysis resistive body and the second analysis resistive body.

DETAILED DESCRIPTION

In the detector for gas chromatography in which only one TCD is formed by one manifold, a large space is required when a plurality of TCDs are required.

A detector for gas chromatography according to an embodiment includes a manifold, a first bridge circuit, and a second bridge circuit. The manifold has formed therein a first analysis flow path to which a first carrier gas including a predetermined component in a first analysis gas is to be supplied, and in which a first analysis resistive body is disposed; a first reference flow path to which the first carrier gas not including the predetermined component in the first analysis gas is to be supplied, and in which a first reference resistive body is disposed; a second analysis flow path to which a second carrier gas including a predetermined component in a second analysis gas is to be supplied, and in which a second analysis resistive body is disposed; and a second reference flow path to which the second carrier gas not including the predetermined component in the second analysis gas is to be supplied, and in which a second reference resistive body is disposed. The first bridge circuit is configured to be capable of detecting the predetermined component in the first analysis gas using the first analysis resistive body and the first reference resistive body. The second bridge circuit is configured to be capable of detecting the predetermined component in the second analysis gas using the second analysis resistive body and the second reference resistive body. The distance between the first analysis resistive body and the second reference resistive body is less than the distance between the first analysis resistive body and the second analysis resistive body. When a gas that has higher or lower thermal conductivity than both the predetermined component in the first analysis gas and the predetermined component in the second analysis gas is used as the first carrier gas and the second carrier gas, this configuration can cause a peak representing noise detected in the second bridge circuit due to a temperature change in the first analysis resistive body to be generated in the opposite direction from a normal peak. It thus becomes easy to identify noise detected in the second bridge circuit, and the detection accuracy improves. The first bridge circuit and the second bridge circuit can therefore be arranged near each other.

In a detector for gas chromatography according to an embodiment with the above configuration, the distance between the second analysis resistive body and the first reference resistive body is less than the distance between the second analysis resistive body and the first analysis resistive body. When a gas that has higher or lower thermal conductivity than both the predetermined component in the first analysis gas and the predetermined component in the second analysis gas is used as the first carrier gas and the second carrier gas, this configuration can cause a peak representing noise detected in the first bridge circuit due to a temperature change in the second analysis resistive body to be generated in the opposite direction from a normal peak. It thus becomes easy to identify noise detected in the first bridge circuit, and the detection accuracy improves. The first bridge circuit and the second bridge circuit can therefore be arranged near each other.

In a detector for gas chromatography according to an embodiment with the above configuration, a line connecting the first analysis resistive body and the first reference resistive body and a line connecting the second analysis resistive body and the second reference resistive body are parallel to each other. This configuration allows an effective reduction of space.

In a detector for gas chromatography according to an embodiment with the above configuration, the first analysis flow path includes an inlet and/or an outlet positioned between the first analysis resistive body and the second reference resistive body, the first reference flow path includes an inlet and/or an outlet positioned between the first reference resistive body and the second analysis resistive body, the second analysis flow path includes an inlet and/or an outlet positioned between the first reference resistive body and the second analysis resistive body, the second reference flow path includes an inlet and/or an outlet positioned between the first analysis resistive body and the second reference resistive body, and the distance between the first analysis resistive body and the first reference resistive body is less than the distance between the first analysis resistive body and the second reference resistive body. With this configuration, the distance between the first analysis resistive body and the second reference resistive body and the distance between the first reference resistive body and the second analysis resistive body can be increased. Hence, the peak detected in the first bridge circuit due to the predetermined component in the second analysis gas and the peak detected in the second bridge circuit due to the predetermined component in the first analysis gas can each be reduced. This increases the detection accuracy and therefore allows an effective reduction of space. This configuration also allows the inlet of each flow path, the outlet of each flow path, or both the inlet and outlet of each flow path to be arranged near the center of the manifold, thereby reducing the effect of the external environment on the detection result.

In a detector for gas chromatography according to an embodiment with the above configuration, at least one of a first analysis cell formed by the first analysis flow path and the first analysis resistive body, a first reference cell formed by the first reference flow path and the first reference resistive body, a second analysis cell formed by the second analysis flow path and the second analysis resistive body, and a second reference cell formed by the second reference flow path and the second reference resistive body is a semi-diffusion type cell. This configuration can reduce noise while maintaining detection accuracy and therefore allows an effective reduction of space.

The present disclosure can provide a space-efficient detector for gas chromatography.

Detectors for gas chromatography according to embodiments of the present disclosure are now described with reference to the drawings. Common elements between drawings are labeled with the same reference numbers. In the present disclosure, the "upper side" refers to the top side of the below-described detector for gas chromatography 1 (e.g., the top in FIG. 2 and the like), and the "lower side" refers to the bottom side of the detector for gas chromatography 1 (e.g., the bottom in FIG. 2 and the like).

First Embodiment

Figure 1:
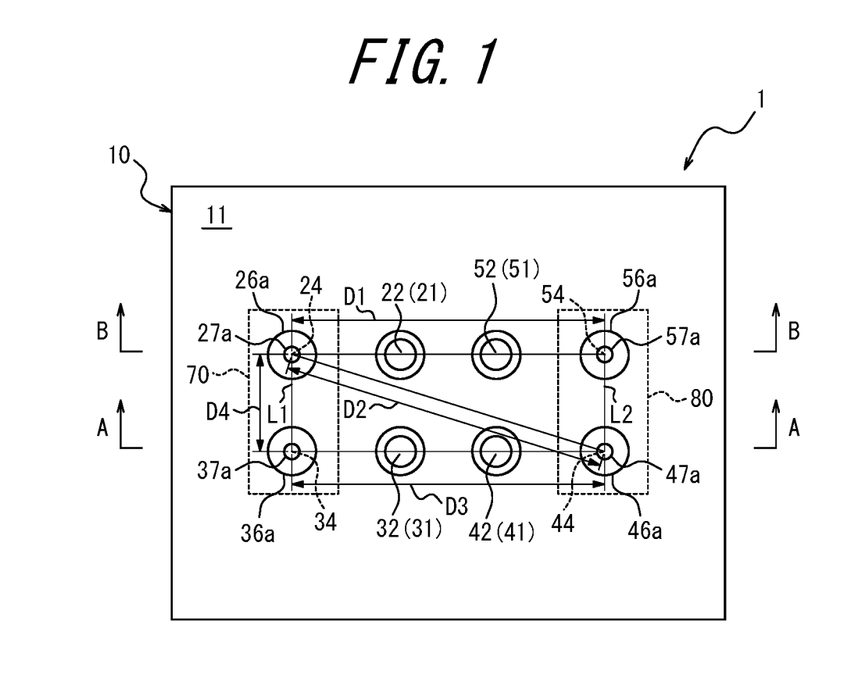
FIG. 1 is a top view of a detector for gas chromatography according to a first embodiment.
Figure 2:
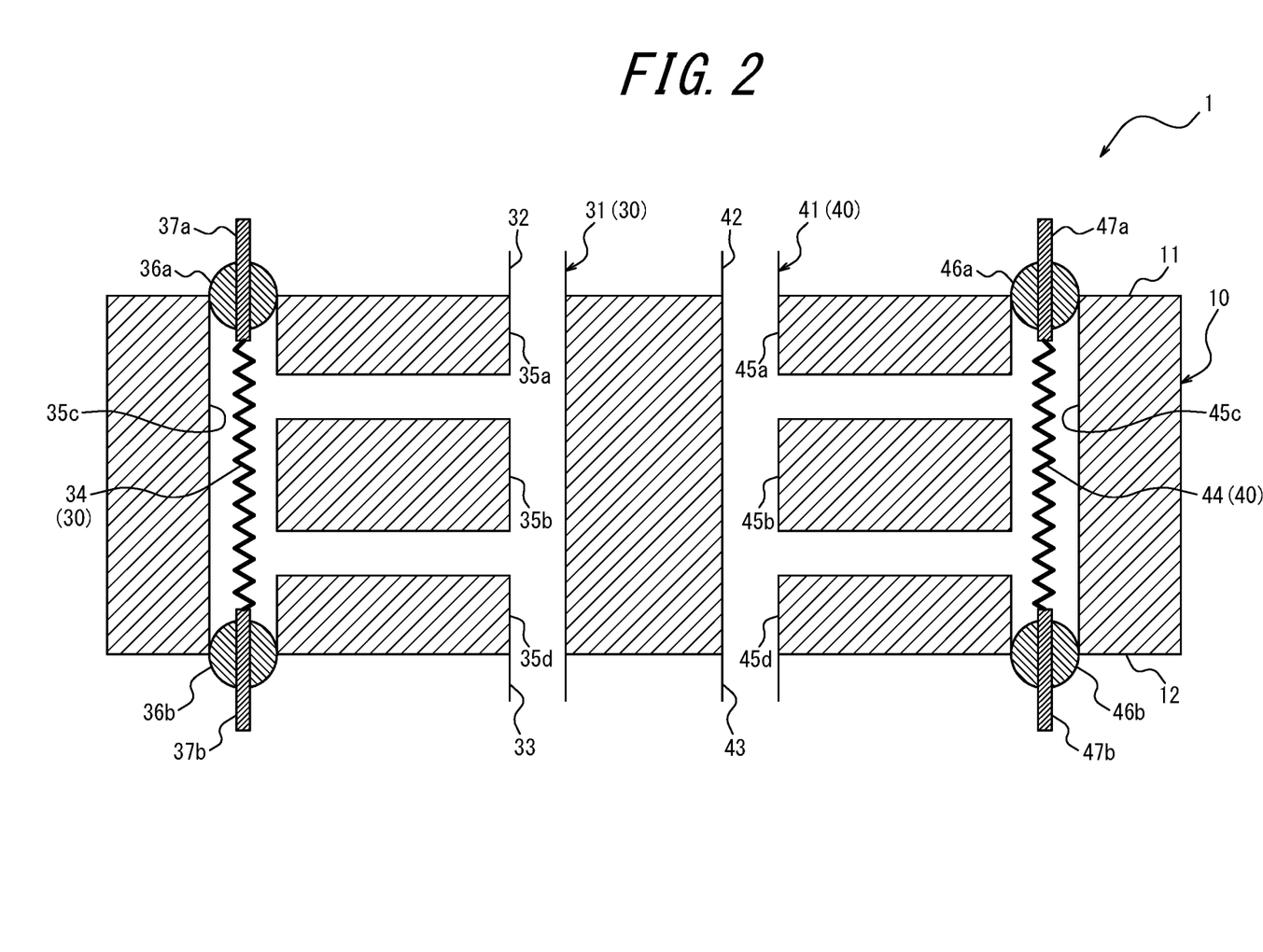
FIG. 2 is an example of a cross-sectional view along the A-A line in FIG. 1.
Figure 3:
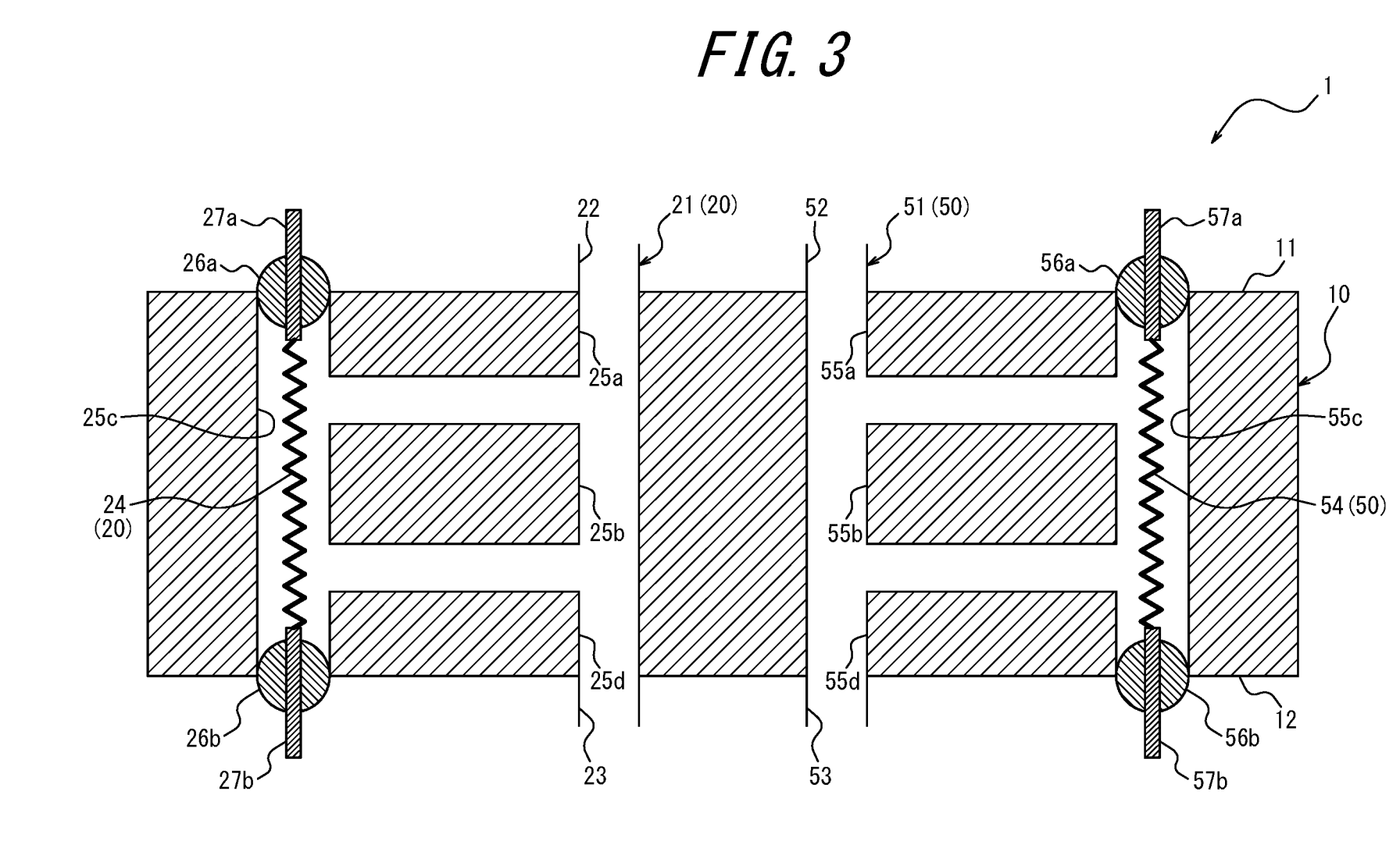
FIG. 3 is an example of a cross-sectional view along the B-B line in FIG. 1.

FIG. 1 is a top view of the detector for gas chromatography 1 according to the first embodiment. FIG. 2 is an example of a cross-sectional view along the A-A line in FIG. 1. FIG. 3 is an example of a cross-sectional view along the B-B line in FIG. 1.

The detector for gas chromatography 1 (detector 1) is a detector used in gas chromatography. In gas chromatography, a carrier gas such as helium, hydrogen, nitrogen, or argon and an analysis gas are supplied to a column to separate the analysis gas into components. The components are discharged from the column over time. When the carrier gas including the analysis gas that has been separated into components is supplied over time to the detector 1, the detector 1 detects the amount of each component in the analysis gas. While details are provided below, the detector 1 is a multidetector that includes a first thermal conductivity detector (first TCD) capable of detecting a predetermined component in a first analysis gas and a second thermal conductivity detector (second TCD) capable of detecting a predetermined component in a second analysis gas.

As illustrated in FIGS. 1 to 3, the detector 1 includes a manifold 10. The manifold 10 is, for example, made of a metal such as aluminum or stainless steel. The shape of the manifold 10 may, for example, have a substantially rectangular parallelepiped shape. A first analysis flow path 21, a first reference flow path 31, a second analysis flow path 41, and a second reference flow path 51 are formed in the manifold 10.

As illustrated in FIG. 3, a first carrier gas including a predetermined component in the first analysis gas is supplied to the first analysis flow path 21 through an inlet 22 formed on a top surface 11 of the manifold 10 and is discharged through an outlet 23 formed on a bottom surface 12 of the manifold 10. The first analysis gas is a gas for analysis that includes one or more components. The first carrier gas is preferably a single component gas with low reactivity, such as helium, hydrogen, nitrogen, or argon.

As illustrated in FIG. 3, a first analysis resistive body 24 is arranged in the first analysis flow path 21. The first analysis resistive body 24 is a filament, for example, but may be a thermistor. The first analysis resistive body 24 is configured to be electrically connectable to the outside of the first analysis flow path 21 via a first lead 27a connected to an upper edge and a second lead 27b connected to a lower edge. The first analysis flow path 21 is closed off from the outside at locations other than the inlet 22 and the outlet 23 by virtue of the area around the first lead 27a being sealed by a first sealing member 26a and the area around the second lead 27b being sealed by a second sealing member 26b. A first analysis cell 20 is formed by the first analysis flow path 21 and the first analysis resistive body 24.

As illustrated in FIG. 2, the first carrier gas not including the first analysis gas is supplied to the first reference flow path 31 through an inlet 32 formed on the top surface 11 of the manifold 10 and is discharged through an outlet 33 formed on the bottom surface 12 of the manifold 10.

As illustrated in FIG. 2, a first reference resistive body 34 is arranged in the first reference flow path 31. The first reference resistive body 34 is a filament, for example, but may be a thermistor. The first reference resistive body 34 is configured to be electrically connectable to the outside of the first reference flow path 31 via a first lead 37a connected to the upper edge and a second lead 37b connected to the lower edge. The first reference flow path 31 is closed off from the outside at locations other than the inlet 32 and the outlet 33 by virtue of the area around the first lead 37a being sealed by a first sealing member 36a and the area around the second lead 37b being sealed by a second sealing member 36b. A first reference cell 30 is formed by the first reference flow path 31 and the first reference resistive body 34.

As illustrated in FIG. 2, a second carrier gas including a predetermined component in the second analysis gas is supplied to the second analysis flow path 41 through an inlet 42 formed on the top surface 11 of the manifold 10 and is discharged through an outlet 43 formed on the bottom surface 12 of the manifold 10. The second analysis gas is a gas for analysis that includes one or more components. The second carrier gas is preferably a single component gas with low reactivity, such as helium, hydrogen, nitrogen, or argon.

As illustrated in FIG. 2, a second analysis resistive body 44 is arranged in the second analysis flow path 41. The second analysis resistive body 44 is a filament, for example, but may be a thermistor. The second analysis resistive body 44 is configured to be electrically connectable to the outside of the second analysis flow path 41 via a first lead 47a connected to the upper edge and a second lead 47b connected to the lower edge. The second analysis flow path 41 is closed off from the outside at locations other than the inlet 42 and the outlet 43 by virtue of the area around the first lead 47a being sealed by a first sealing member 46a and the area around the second lead 47b being sealed by a second sealing member 46b. A second analysis cell 40 is formed by the second analysis flow path 41 and the second analysis resistive body 44.

As illustrated in FIG. 3, the second carrier gas not including the second analysis gas is supplied to the second reference flow path 51 through an inlet 52 formed on the top surface 11 of the manifold 10 and is discharged through an outlet 53 formed on the bottom surface 12 of the manifold 10.

As illustrated in FIG. 3, a second reference resistive body 54 is arranged in the second reference flow path 51. The second reference resistive body 54 is a filament, for example, but may be a thermistor. The second reference resistive body 54 is configured to be electrically connectable to the outside of the second reference flow path 51 via a first lead 57a connected to the upper edge and a second lead 57b connected to the lower edge. The second reference flow path 51 is closed off from the outside at locations other than the inlet 52 and the outlet 53 by virtue of the area around the first lead 57a being sealed by a first sealing member 56a and the area around the second lead 57b being sealed by a second sealing member 56b. A second reference cell 50 is formed by the second reference flow path 51 and the second reference resistive body 54.

As illustrated in FIGS. 2 and 3, the first analysis resistive body 24, the first reference resistive body 34, the second analysis resistive body 44, and the second reference resistive body 54 are each elongate in form and are arranged in parallel to each other.

The first analysis cell 20 is preferably a semi-diffusion type cell. In this case, as illustrated in FIG. 3, the first analysis flow path 21 is formed by a first internal flow path 25a connecting from the inlet 22, a second internal flow path 25b that is a flow path branching off from the first internal flow path 25a, a third internal flow path 25c that is another flow path branching off from the first internal flow path 25a, and a fourth internal flow path 25d where the second internal flow path 25b and the third internal flow path 25c combine and connect to the outlet 23. The first analysis resistive body 24 is arranged in the third internal flow path 25c.

When the first analysis cell 20 is such a semi-diffusion type cell, the gas supplied to the inlet 22 of the first analysis flow path 21 passes through the first internal flow path 25a and divides into gas that flows into the second internal flow path 25b and gas that flows into the third internal flow path 25c. Subsequently, the gas that flowed into the second internal flow path 25b and the gas that flowed into the third internal flow path 25c combine, pass through the fourth internal flow path 25d, and are discharged from the outlet 23.

The first reference cell 30 is also preferably a semi-diffusion type cell. In this case, as illustrated in FIG. 2, the first reference flow path 31 is formed by a first internal flow path 35a connecting from the inlet 32, a second internal flow path 35b that is a flow path branching off from the first internal flow path 35a, a third internal flow path 35c that is another flow path branching off from the first internal flow path 35a, and a fourth internal flow path 35d where the second internal flow path 35b and the third internal flow path 35c combine and connect to the outlet 33. The first reference resistive body 34 is arranged in the third internal flow path 35c.

When the first reference cell 30 is such a semi-diffusion type cell, the gas supplied to the inlet 32 of the first reference flow path 31 passes through the first internal flow path 35a and divides into gas that flows into the second internal flow path 35b and gas that flows into the third internal flow path 35c. Subsequently, the gas that flowed into the second internal flow path 35b and the gas that flowed into the third internal flow path 35c combine, pass through the fourth internal flow path 35d, and are discharged from the outlet 33.

By the first analysis cell 20 and the first reference cell 30 each being such a semi-diffusion type cell, the flow of gas into the third internal flow path 25c in which the first analysis resistive body 24 is arranged and the flow of gas into the third internal flow path 35c in which the first reference resistive body 34 is arranged can each be reduced as compared with a straight type cell and increased as compared with a diffusion type cell. Consequently, noise can be reduced while maintaining detection accuracy when detecting a predetermined component in the first analysis gas with the first analysis resistive body 24 and the first reference resistive body 34.

Similarly, the second analysis cell 40 is preferably a semi-diffusion type cell. In this case, as illustrated in FIG. 2, the second analysis flow path 41 is formed by a first internal flow path 45a connecting from the inlet 42, a second internal flow path 45b that is a flow path branching off from the first internal flow path 45a, a third internal flow path 45c that is another flow path branching off from the first internal flow path 45a, and a fourth internal flow path 45d where the second internal flow path 45b and the third internal flow path 45c combine and connect to the outlet 43. The second analysis resistive body 44 is arranged in the third internal flow path 45c.

The second reference cell 50 is also preferably a semi-diffusion type cell. In this case, as illustrated in FIG. 3, the second reference flow path 51 is formed by a first internal flow path 55a connecting from the inlet 52, a second internal flow path 55b that is a flow path branching off from the first internal flow path 55a, a third internal flow path 55c that is another flow path branching off from the first internal flow path 55a, and a fourth internal flow path 55d where the second internal flow path 55b and the third internal flow path 55c combine and connect to the outlet 53. The second reference resistive body 54 is arranged in the third internal flow path 55c.

By the second analysis cell 40 and the second reference cell 50 each being such a semi-diffusion type cell, the flow of gas into the third internal flow path 45c in which the second analysis resistive body 44 is arranged and the flow of gas into the third internal flow path 55c in which the second reference resistive body 54 is arranged can each be reduced as compared with a straight type cell and increased as compared with a diffusion type cell. Consequently, noise can be reduced while maintaining detection accuracy when detecting a predetermined component in the second analysis gas with the second analysis resistive body 44 and the second reference resistive body 54.

Figure 4:
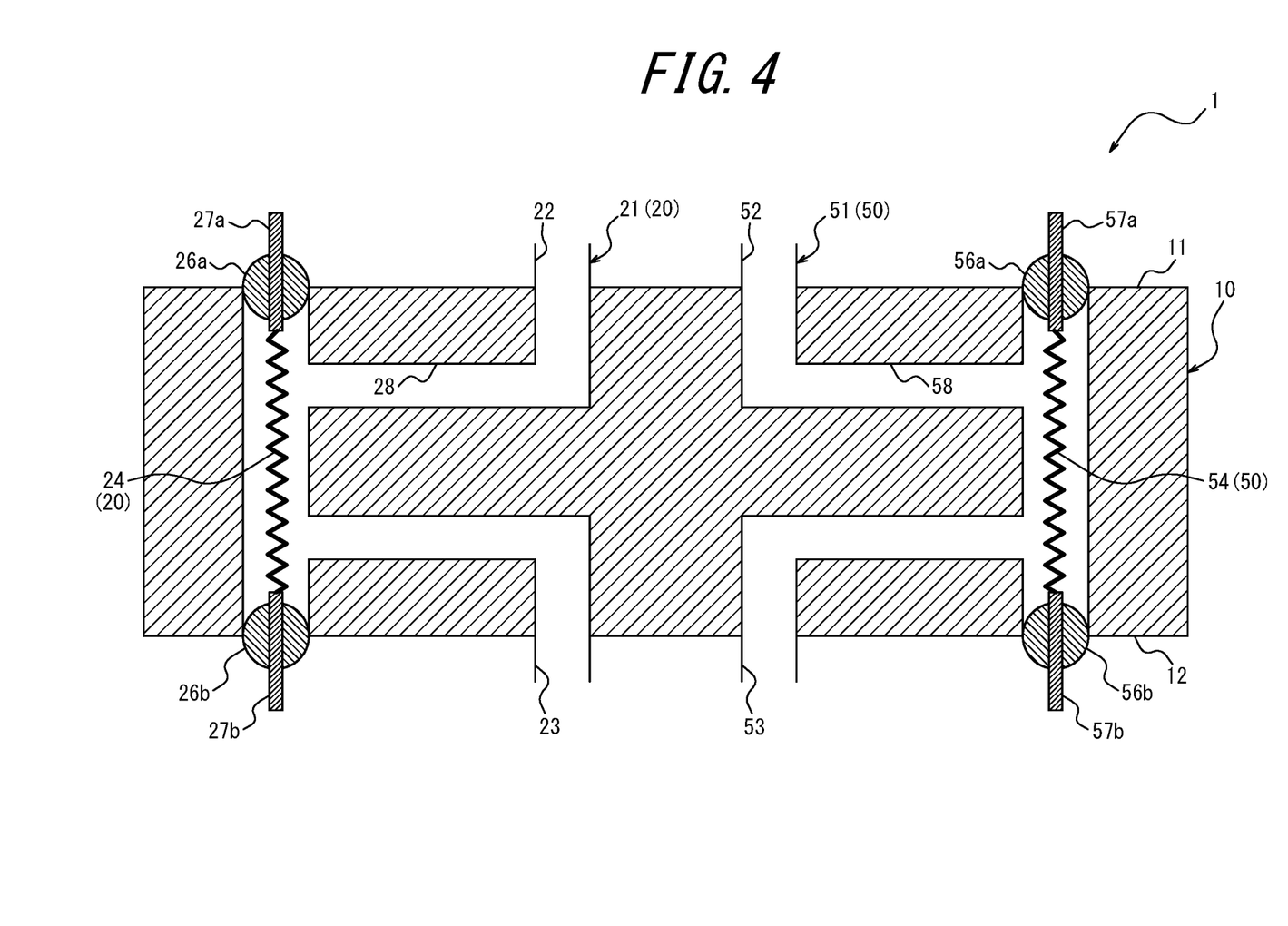
FIG. 4 is another example of a cross-sectional view along the B-B line in FIG. 1.

FIG. 4 is another example of a cross-sectional view along the B-B line in FIG. 1. The first analysis cell 20 may be a straight type cell. In this case, as illustrated in FIG. 4, the first analysis flow path 21 is formed by an internal flow path 28 that connects the inlet 22 to the outlet 23 without branching into or combining with other flow paths. The first analysis resistive body 24 is arranged in the internal flow path 28.

When the first analysis cell 20 is such a straight type cell, the gas supplied to the inlet 22 of the first analysis flow path 21 passes through the internal flow path 28, contacts the first analysis resistive body 24 without branching, and is then discharged from the outlet 23.

While omitted from the drawings, the first reference cell 30 may also be a straight type cell like the first analysis cell 20. By the first analysis cell 20 and the first reference cell 30 each being such a straight type cell, the flow of gas into the internal flow path 28 in which the first analysis resistive body 24 is arranged and the flow of gas into the internal flow path in which the first reference resistive body 34 is arranged can each be increased as compared with a diffusion type cell and a semi-diffusion type cell. Accordingly, although noise increases, the detection accuracy can be improved when detecting a predetermined component in the first analysis gas with the first analysis resistive body 24 and the first reference resistive body 34.

Similarly, the second reference cell 50 may be a straight type cell. In this case, as illustrated in FIG. 4, the second reference flow path 51 is formed by an internal flow path 58 that connects the inlet 52 to the outlet 53 without branching into or combining with other flow paths. The second reference resistive body 54 is arranged in the internal flow path 58.

When the second reference cell 50 is such a straight type cell, the gas supplied to the inlet 52 of the second reference flow path 51 passes through the internal flow path 58, contacts the second reference resistive body 54 without branching, and is then discharged from the outlet 53.

While omitted from the drawings, the second analysis cell 40 may also be a straight type cell like the second reference cell 50. By the second analysis cell 40 and the second reference cell 50 each being such a straight type cell, the flow of gas into the internal flow path in which the second analysis resistive body 44 is arranged and the flow of gas into the internal flow path 58 in which the second reference resistive body 54 is arranged can each be increased as compared with a diffusion type cell and a semi-diffusion type cell. Accordingly, although noise increases, the detection accuracy can be improved when detecting a predetermined component in the second analysis gas with the second analysis resistive body 44 and the second reference resistive body 54.

Figure 5:
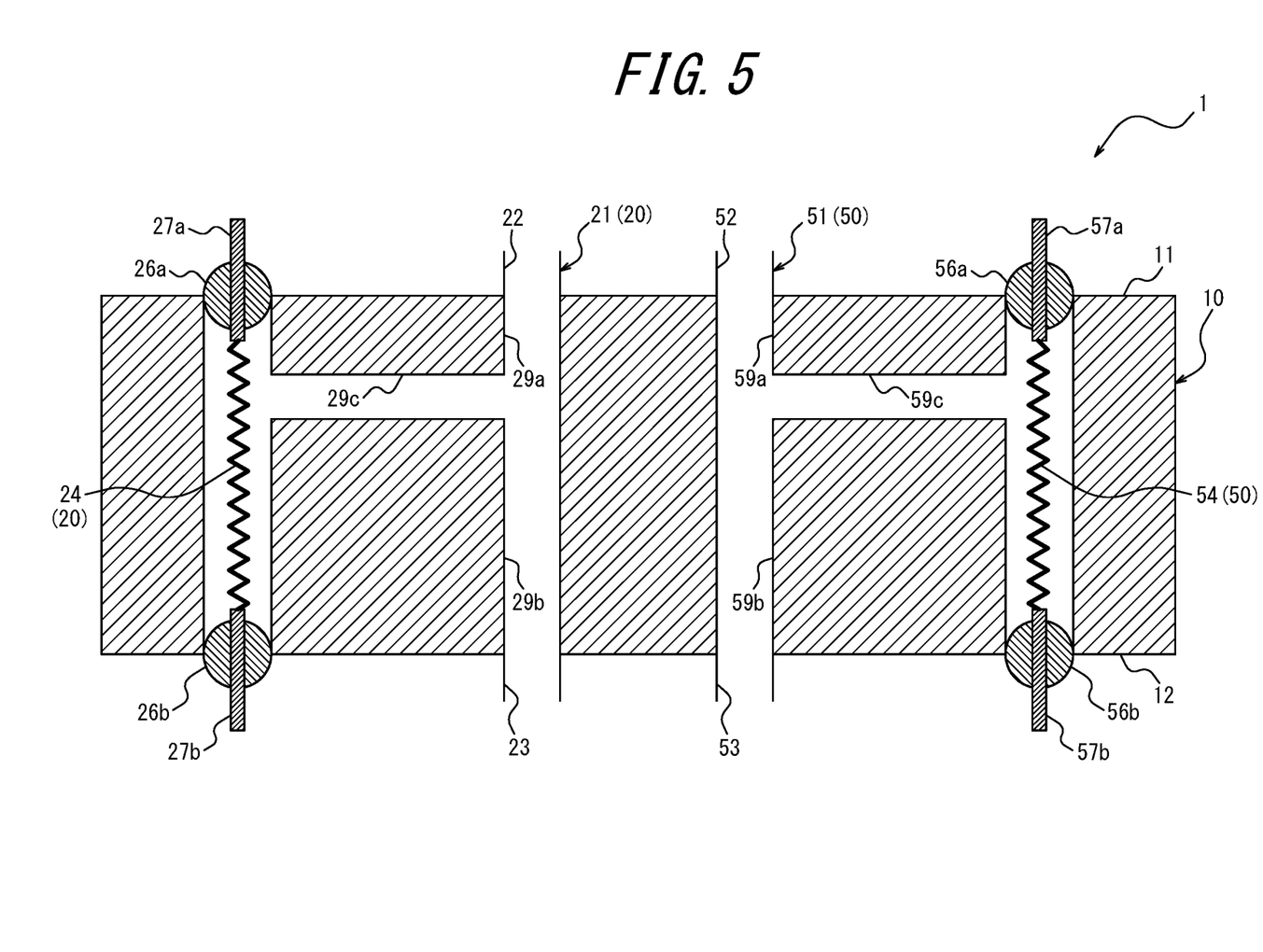
FIG. 5 is yet another example of a cross-sectional view along the B-B line in FIG. 1.

FIG. 5 is yet another example of a cross-sectional view along the B-B line in FIG. 1. The first analysis cell 20 may be a diffusion type cell. In this case, as illustrated in FIG. 5, the first analysis flow path 21 includes a first internal flow path 29a connecting from the inlet 22, a second internal flow path 29b that is a flow path branching off from the first internal flow path 29a and connecting to the outlet 23, and a third internal flow path 29c that is another flow path branching off from the first internal flow path 29a. The first analysis resistive body 24 is arranged in the third internal flow path 29c.

When the first analysis cell 20 is such a diffusion type cell, the gas supplied to the inlet 22 of the first analysis flow path 21 first passes through the first internal flow path 29a. Most of the gas then flows into the second internal flow path 29b and is discharged from the outlet 23, whereas a portion of the gas diffuses into the third internal flow path 29c.

While omitted from the drawings, the first reference cell 30 may also be a diffusion type cell like the first analysis cell 20. By the first analysis cell 20 and the first reference cell 30 each being such a diffusion type cell, the flow of gas that diffuses into the third internal flow path 29c in which the first analysis resistive body 24 is arranged and the flow of gas that diffuses into the third internal flow path in which the first reference resistive body 34 is arranged can each be reduced as compared with a straight type cell and a semi-diffusion type cell. Accordingly, although the detection accuracy decreases, noise can be reduced when detecting a predetermined component in the first analysis gas with the first analysis resistive body 24 and the first reference resistive body 34.

Similarly, the second reference cell 50 may be a diffusion type cell. In this case, as illustrated in FIG. 5, the second reference flow path 51 includes a first internal flow path 59a connecting from the inlet 52, a second internal flow path 59b that is a flow path branching off from the first internal flow path 59a and connecting to the outlet 53, and a third internal flow path 59c that is another flow path branching off from the first internal flow path 59a. The second reference resistive body 54 is arranged in the third internal flow path 59c.

When the second reference cell 50 is such a diffusion type cell, the gas supplied to the inlet 52 of the second reference flow path 51 first passes through the first internal flow path 59a. Most of the gas then flows into the second internal flow path 59b and is discharged from the outlet 53, whereas a portion of the gas diffuses into the third internal flow path 59c.

While omitted from the drawings, the second analysis cell 40 may also be a diffusion type cell like the second reference cell 50. By the second analysis cell 40 and the second reference cell 50 each being such a diffusion type cell, the flow of gas that diffuses into the third internal flow path in which the second analysis resistive body 44 is arranged and the flow of gas that diffuses into the third internal flow path 59c in which the second reference resistive body 54 is arranged can each be reduced as compared with a straight type cell and a semi-diffusion type cell. Accordingly, although the detection accuracy decreases, noise can be reduced when detecting a predetermined component in the second analysis gas with the second analysis resistive body 44 and the second reference resistive body 54.

Figure 6:
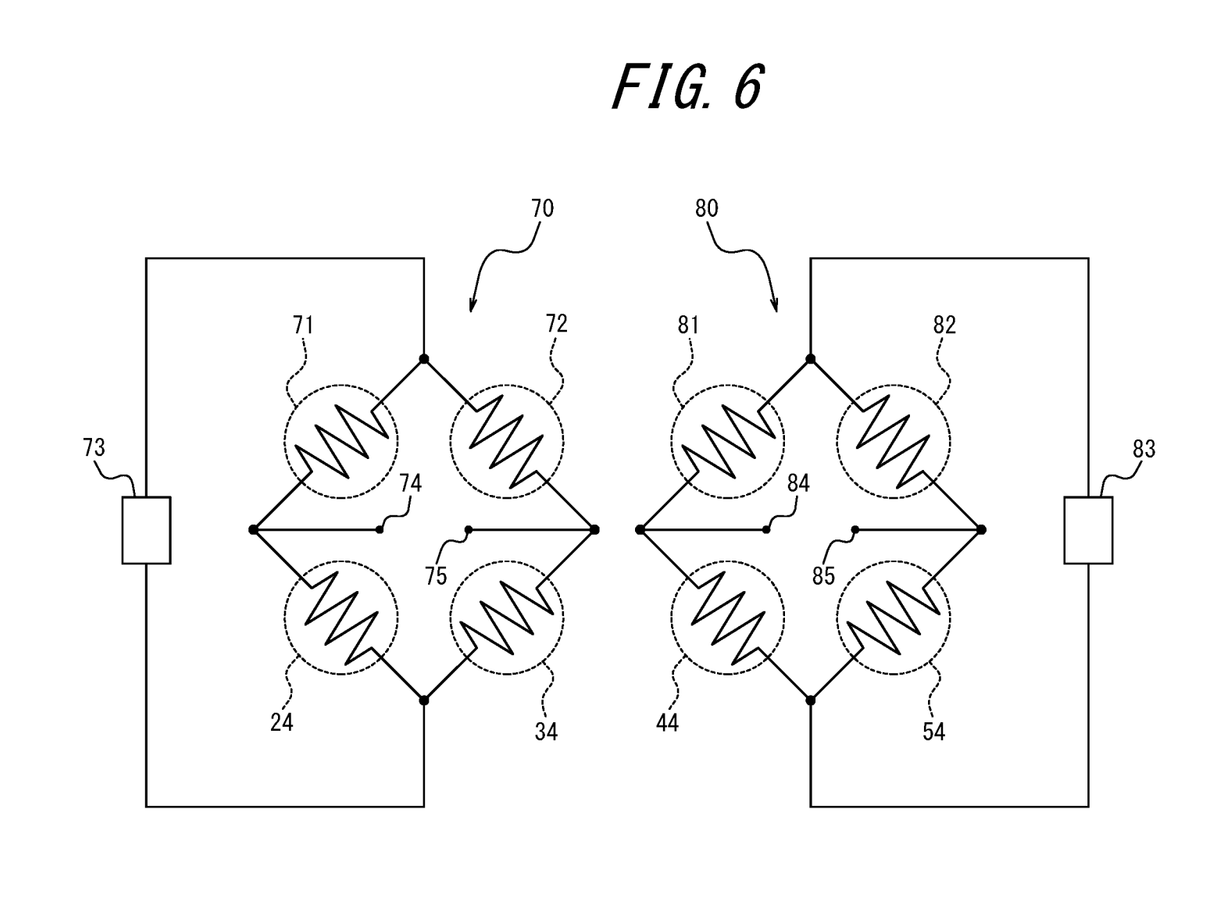
FIG. 6 illustrates the configuration of a first bridge circuit and a second bridge circuit in the detector for gas chromatography in FIG. 1.

As illustrated in FIG. 1, the detector 1 further includes a first bridge circuit 70 and a second bridge circuit 80. FIG. 6 illustrates the configuration of the first bridge circuit 70 and the second bridge circuit 80 of the detector 1.

As illustrated in FIG. 6, the first bridge circuit 70 is formed to be capable of detecting a predetermined component in the first analysis gas using the first analysis resistive body 24 and the first reference resistive body 34. In greater detail, the first bridge circuit 70 is a bridge circuit formed by the first analysis resistive body 24, the first reference resistive body 34, a first resistor 71, and a second resistor 72. The first resistor 71 and the second resistor 72 are resistors that are not located in any of the first analysis flow path 21, the first reference flow path 31, the second analysis flow path 41, and the second reference flow path 51. The first resistor 71 and the second resistor 72 may be located outside of the manifold 10. To reduce the effect of temperature changes in the external environment, the first resistor 71 and the second resistor 72 are preferably located inside a thermostatic chamber 60 as described below (see FIG. 8) and more preferably located inside sheet metal cases 61a, 61b (see FIG. 8).

In the present example, a filament is used as the first analysis resistive body 24, and a filament is used as the first reference resistive body 34. In a state in which the first carrier gas including a predetermined component in the first analysis gas is being supplied to the first analysis flow path 21 (see FIG. 3 and the like) and the first carrier gas not including the predetermined component in the first analysis gas is being supplied to the first reference flow path 31 (see FIG. 2 and the like), power from a first power source 73 is supplied to the first bridge circuit 70 and the first analysis resistive body 24 and the first reference resistive body 34 generate heat. The temperature of the first analysis resistive body 24 changes due to the supply of the first carrier gas including the predetermined component in the first analysis gas, causing the resistance of the first analysis resistive body 24 to change. Similarly, the temperature of the first reference resistive body 34 changes due to the supply of the first carrier gas not including the predetermined component in the first analysis gas, causing the resistance of the first reference resistive body 34 to change. The change in the resistance of the first resistor 71 and the second resistor 72, on the other hand, is sufficiently small as compared to the change in the resistance of the first analysis resistive body 24 and the first reference resistive body 34 and can therefore be ignored. Accordingly, by measuring the change over time in the potential difference in the first bridge circuit 70 between a first detection point 74, located between the first analysis resistive body 24 and the first resistor 71, and a second detection point 75, located between the first reference resistive body 34 and the second resistor 72, the amount (e.g., concentration) of the predetermined component in the first analysis gas can be detected on the basis of the peak (e.g., height or area) of the change over time. In other words, the first bridge circuit 70 constitutes the first TCD capable of detecting a predetermined component in the first analysis gas. The first bridge circuit 70 may be a Wheatstone bridge circuit that uses the first power source 73 as a direct current power source.

Similarly, as illustrated in FIG. 6, the second bridge circuit 80 is formed to be capable of detecting a predetermined component in the second analysis gas using the second analysis resistive body 44 and the second reference resistive body 54. In greater detail, the second bridge circuit 80 is a bridge circuit formed by the second analysis resistive body 44, the second reference resistive body 54, a third resistor 81, and a fourth resistor 82. The third resistor 81 and the fourth resistor 82 are resistors that are not located in any of the first analysis flow path 21, the first reference flow path 31, the second analysis flow path 41, and the second reference flow path 51. The third resistor 81 and the fourth resistor 82 may be located outside of the manifold 10. To reduce the effect of temperature changes in the external environment, the third resistor 81 and the fourth resistor 82 are preferably located inside the thermostatic chamber 60 described below (see FIG. 8) and more preferably located inside the sheet metal cases 61a, 61b (see FIG. 8).

In the present example, a filament is used as the second analysis resistive body 44, and a filament is used as the second reference resistive body 54. In a state in which the second carrier gas including a predetermined component in the second analysis gas is being supplied to the second analysis flow path 41 (see FIG. 2 and the like) and the second carrier gas not including the predetermined component in the second analysis gas is being supplied to the second reference flow path 51 (see FIG. 3 and the like), power from the second power source 83 is supplied to the second bridge circuit 80 and the second analysis resistive body 44 and the second reference resistive body 54 generate heat. The temperature of the second analysis resistive body 44 changes due to the supply of the second carrier gas including the predetermined component of the second analysis gas, causing the resistance of the second analysis resistive body 44 to change. Similarly, the temperature of the second reference resistive body 54 changes due to the supply of the second carrier gas not including the predetermined component of the second analysis gas, causing the resistance of the second reference resistive body 54 to change. The change in the resistance of the third resistor 81 and the fourth resistor 82, on the other hand, is sufficiently small as compared to the change in the resistance of the second analysis resistive body 44 and the second reference resistive body 54 and can therefore be ignored. Accordingly, by measuring the change over time in the potential difference in the second bridge circuit 80 between a third detection point 84, located between the second analysis resistive body 44 and the third resistor 81, and a fourth detection point 85, located between the second reference resistive body 54 and the fourth resistor 82, the amount (e.g., concentration) of the predetermined component in the second analysis gas can be detected on the basis of the peak (e.g., height or area) of the change over time. In other words, the second bridge circuit 80 constitutes the second TCD capable of detecting a predetermined component in the second analysis gas. The second bridge circuit 80 may be a Wheatstone bridge circuit that uses the second power source 83 as a direct current power source.

If hydrogen, which has the highest thermal conductivity among gasses, is used as the first carrier gas and the second carrier gas, then the temperature of the first analysis resistive body 24 rises upon a predetermined component in the first analysis gas being supplied to the first analysis flow path 21. This heat may then propagate through the first carrier gas to the manifold 10 and propagate through the second carrier gas to the second analysis resistive body 44 in the second analysis flow path 41 or the second reference resistive body 54 in the second reference flow path 51. Consequently, the peak due to the predetermined component in the first analysis gas might be detected in the second bridge circuit 80 as well.

Figure 7:
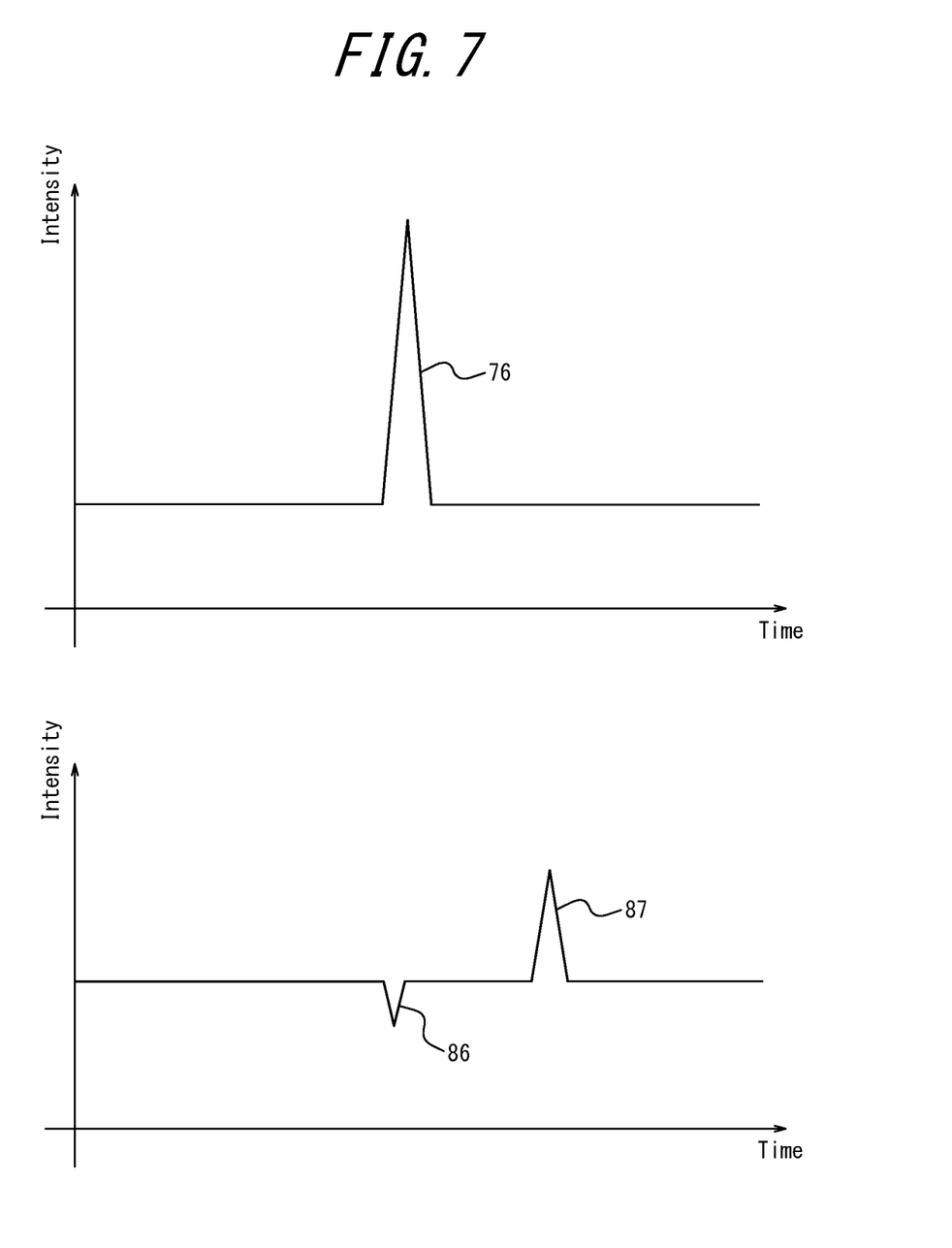
FIG. 7 is a conceptual view of the detection result of the detector for gas chromatography in FIG. 1.

To address this, the detector 1 of the present embodiment is configured so that the distance D1 between the first analysis resistive body 24 and the second reference resistive body 54 is less than the distance D2 between the first analysis resistive body 24 and the second analysis resistive body 44, as illustrated in FIG. 1. FIG. 7 is a conceptual view of the detection result of the detector 1. Specifically, the graph at the top of FIG. 7 illustrates the virtual detection result by the first bridge circuit 70, and the graph at the bottom illustrates the virtual detection result by the second bridge circuit 80. In the graphs at the top and bottom of FIG. 7, the horizontal axis represents time, and the vertical axis represents intensity. As described above, in the case of the first carrier gas and the second carrier gas being hydrogen, as illustrated in FIG. 7, when a large first peak 76 is detected in the first bridge circuit 70 as a result of a large amount of a predetermined component in the first analysis gas being supplied to the first analysis resistive body 24, the temperature of the first analysis resistive body 24 rises due to the predetermined component in the first analysis gas. Since the distance D1 is less than the distance D2, as described above, the heat of the first analysis resistive body 24 propagates more intensely to the second reference resistive body 54 than to the second analysis resistive body 44. The second reference resistive body 54 thus reaches a higher temperature than does the second analysis resistive body 44 due to the predetermined component in the first analysis gas. Consequently, in the second bridge circuit 80, a second peak 86 that is noise caused by the predetermined component in the first analysis gas occurs in the opposite direction from a third peak 87 that is detected due to a predetermined component in the second analysis gas. A peak detected in the second bridge circuit 80 due to the predetermined component in the first analysis gas can therefore easily be identified as noise, since the peak is in the opposite direction from the peak detected due to the predetermined component in the second analysis gas. Hence, a multidetector that includes two TCDs can be kept to a small size while reducing the effect of the analysis gas detected in one TCD on the other TCD.

In this way, the detector 1 of the present embodiment can improve the detection accuracy by using hydrogen as the first carrier gas and the second carrier gas, for example, thereby allowing the two TCDs to be arranged near each other. This effect can be achieved when, as the first carrier gas and the second carrier gas, a gas that has higher or lower thermal conductivity than both the predetermined component in the first analysis gas and the predetermined component in the second analysis gas is used.

Furthermore, the detector 1 of the present embodiment is configured so that the distance D3 between the second analysis resistive body 44 and the first reference resistive body 34 is less than the distance D2 between the second analysis resistive body 44 and the first analysis resistive body 24, as illustrated in FIG. 1. In addition to the above-described effect, a peak detected in the first bridge circuit 70 due to the predetermined component in the second analysis gas can therefore easily be identified as noise, since the peak is in the opposite direction from the peak detected due to the predetermined component in the first analysis gas. Hence, a multidetector that includes two TCDs can be kept to a small size while reducing the effect of the analysis gas detected in each TCD on the other TCD.

As illustrated in FIG. 1, the detector 1 of the present embodiment is configured so that a line L1 connecting the first analysis resistive body 24 and the first reference resistive body 34 and a line L2 connecting the second analysis resistive body 44 and the second reference resistive body 54 are parallel to each other. In other words, the first analysis resistive body 24 and the second analysis resistive body 44 are positioned on diagonally opposite corners, and the first reference resistive body 34 and the second reference resistive body 54 are positioned on diagonally opposite corners.

Furthermore, as illustrated in FIG. 1, the inlet 22 of the first analysis flow path 21 is positioned between the first analysis resistive body 24 and the second reference resistive body 54. The inlet 32 of the first reference flow path 31 is also positioned between the first reference resistive body 34 and the second analysis resistive body 44. The inlet 42 of the second analysis flow path 41 is also positioned between the first reference resistive body 34 and the second analysis resistive body 44. The inlet 52 of the second reference flow path 51 is also positioned between the first analysis resistive body 24 and the second reference resistive body 54. Furthermore, the distance D4 between the first analysis resistive body 24 and the first reference resistive body 34 is less than the distance D1 between the first analysis resistive body 24 and the second reference resistive body 54. Consequently, the first analysis resistive body 24, the first reference resistive body 34, the second analysis resistive body 44, and the second reference resistive body 54 are positioned at the four vertices of a rectangle in the top view in FIG. 1. The first analysis resistive body 24 and the second reference resistive body 54 are adjacent along one long side of the rectangle. Similarly, the first reference resistive body 34 and the second analysis resistive body 44 are adjacent along the other long side of the rectangle.

This configuration can increase the distance D1 between the first analysis resistive body 24 and the second reference resistive body 54 and the distance D3 between the first reference resistive body 34 and the second analysis resistive body 44, thereby reducing the peak detected in the first bridge circuit 70 due to the predetermined component in the second analysis gas and the peak detected in the second bridge circuit 80 due to the predetermined component in the first analysis gas.

This configuration can also reduce the effect of the external environment by allowing the inlet of each flow path to be positioned near the center of the top surface 11 of the manifold 10. The positional relationships of the inlets of the flow paths are prescribed in the above configuration, but in addition to or instead of the inlets of the flow paths having these positional relationships, the outlets of the flow paths may have similar positional relationships.

Figure 8:
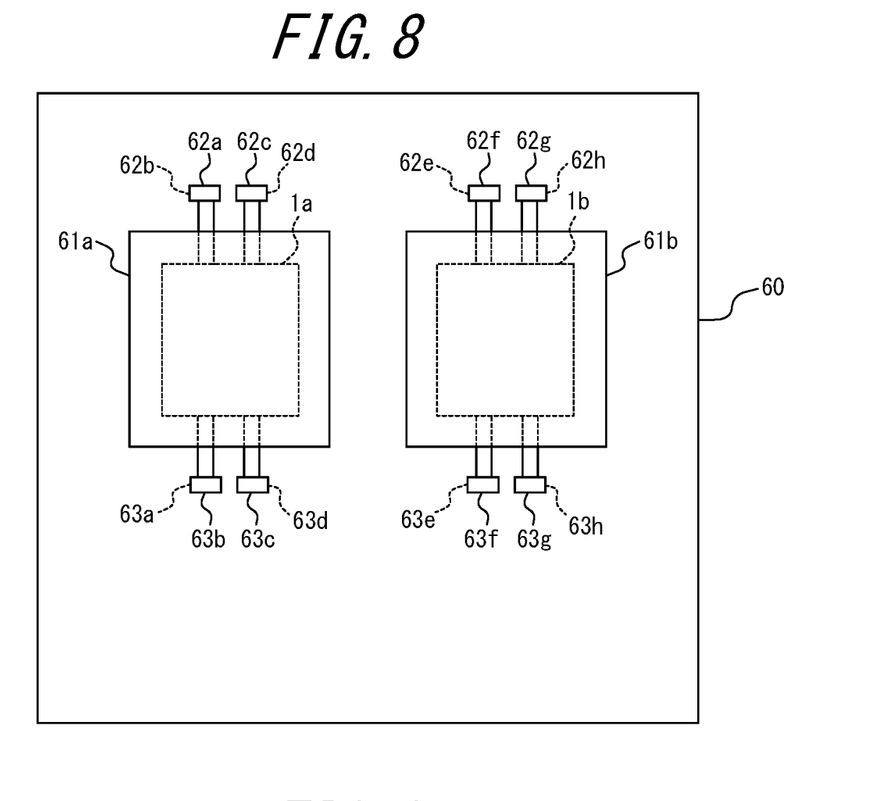
FIG. 8 is a front view of an example of a mode of use of the detector for gas chromatography in FIG. 1.

FIG. 8 is a front view of an example of a mode of use of the detector 1. As illustrated in FIG. 8, the detector 1 may be installed in a thermostatic chamber 60. The temperature inside the thermostatic chamber 60 is controlled to stay within a certain range to reduce the effect of a temperature change due to the surrounding environment. In the example illustrated in FIG. 8, two detectors 1 are installed inside the thermostatic chamber 60. In greater detail, one detector 1*a* of the two detectors 1 is housed in a sheet metal case 61*a* installed in the thermostatic chamber 60. The other detector 1*b* of the two detectors 1 is housed in a sheet metal case 61*b* installed in the thermostatic chamber 60. Both the sheet metal case 61*a* and the sheet metal case 61*b* are filled with an insulating material. With this configuration, the effect on the detection result of heat propagating between the detector 1*a* and the detector 1*b* is small enough to be negligible. One detector 1, or three or more detectors 1, may be installed in the thermostatic chamber 60 instead of two detectors 1.

Four supply pipes 62*a* to 62*d* capable of supplying gas are connected to the inlets of the flow paths of the detector 1*a*, one pipe per inlet. Four discharge pipes 63*a* to 63*d* capable of discharging gas are connected to the outlets of the flow paths of the detector 1a, one pipe per inlet. Similarly, four supply pipes 62e to 62h capable of supplying gas are connected to the inlets of the flow paths of the detector 1b, one pipe per inlet. Four discharge pipes 63e to 63h capable of discharging gas are connected to the outlets of the flow paths of the detector 1b, one pipe per inlet.

Second Embodiment

Figure 9:
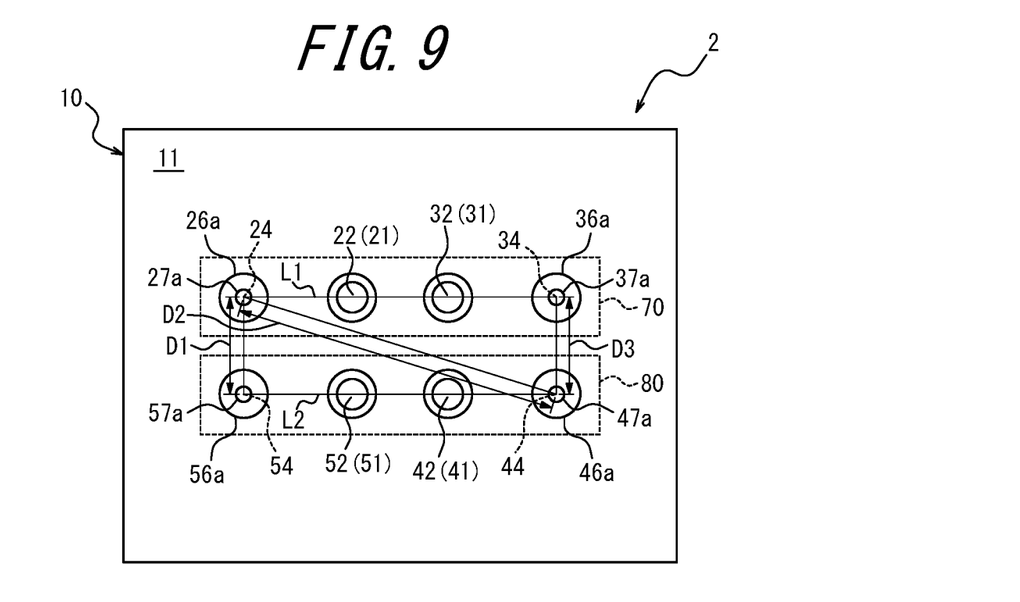
FIG. 9 is a top view of a detector for gas chromatography according to a second embodiment.

FIG. 9 is a top view of a detector for gas chromatography 2 according to the second embodiment. The detector for gas chromatography 2 (detector 2) has the structure of the detector 1 in the first embodiment, except that the positions of the first reference resistive body 34 and the second reference resistive body 54 are switched, and the positions of the first reference flow path 31 and the second reference flow path 51 are switched.

As illustrated in FIG. 9, the detector 2 of the present embodiment is configured so that the distance D1 between the first analysis resistive body 24 and the second reference resistive body 54 is less than the distance D2 between the first analysis resistive body 24 and the second analysis resistive body 44, like the detector 1 of the first embodiment. Furthermore, the detector 2 is configured so that the distance D3 between the second analysis resistive body 44 and the first reference resistive body 34 is less than the distance D2 between the second analysis resistive body 44 and the first analysis resistive body 24. With the detector 2 of the present embodiment, as with the detector 1 of the first embodiment, a peak detected in the second bridge circuit 80 due to the predetermined component in the first analysis gas can therefore easily be identified as noise, since the peak is in the opposite direction from the peak detected due to the predetermined component in the second analysis gas. A peak detected in the first bridge circuit 70 due to the predetermined component in the second analysis gas can also easily be identified as noise, since the peak is in the opposite direction from the peak detected due to the predetermined component in the first analysis gas.

As illustrated in FIG. 9, the detector 2 of the present embodiment is configured so that a line L1 connecting the first analysis resistive body 24 and the first reference resistive body 34 and a line L2 connecting the second analysis resistive body 44 and the second reference resistive body 54 are parallel to each other, like the detector 1 of the first embodiment. In other words, the first analysis resistive body 24 and the second analysis resistive body 44 are positioned on diagonally opposite corners, and the first reference resistive body 34 and the second reference resistive body 54 are positioned on diagonally opposite corners.

Third Embodiment

Figure 10:
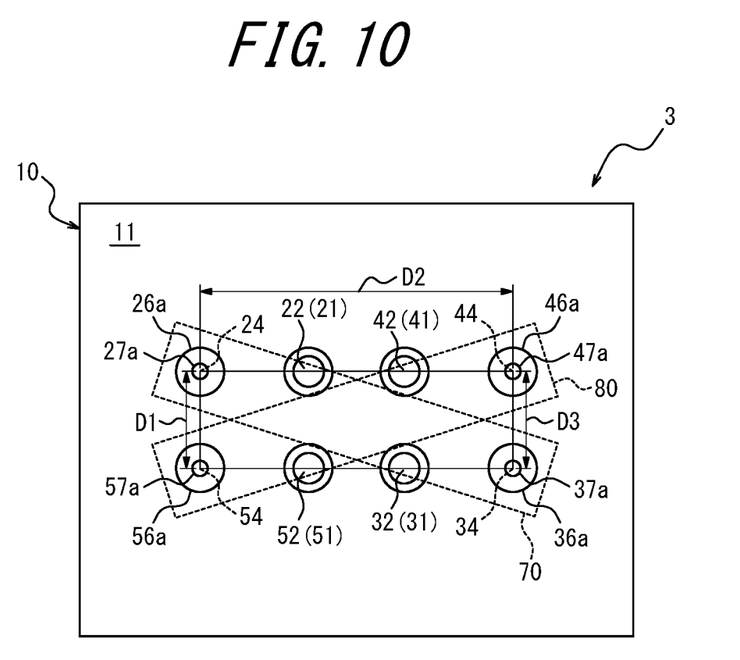
FIG. 10 is a top view of a detector for gas chromatography according to a third embodiment.

FIG. 10 is a top view of a detector for gas chromatography 3 according to the third embodiment. The detector for gas chromatography 3 (detector 3) has the structure of the detector 2 in the second embodiment, except that the positions of the first reference resistive body 34 and the second analysis resistive body 44 are switched, and the positions of the first reference flow path 31 and the second analysis flow path 41 are switched.

As illustrated in FIG. 10, the detector 3 of the present embodiment is configured so that the distance D1 between the first analysis resistive body 24 and the second reference resistive body 54 is less than the distance D2 between the first analysis resistive body 24 and the second analysis resistive body 44, like the detector 1 of the first embodiment and the detector 2 of the second embodiment. Furthermore, the detector 3 is configured so that the distance D3 between the second analysis resistive body 44 and the first reference resistive body 34 is less than the distance D2 between the second analysis resistive body 44 and the first analysis resistive body 24. With the detector 3 of the present embodiment, as with the detector 1 of the first embodiment and the detector 2 of the second embodiment, a peak detected in the second bridge circuit 80 due to the predetermined component in the first analysis gas can therefore easily be identified as noise, since the peak is in the opposite direction from the peak detected due to the predetermined component in the second analysis gas. A peak detected in the first bridge circuit 70 due to the predetermined component in the second analysis gas can also easily be identified as noise, since the peak is in the opposite direction from the peak detected due to the predetermined component in the first analysis gas.

Although embodiments of the present disclosure have been described through drawings and examples, it is to be noted that various changes and modifications will be apparent to those skilled in the art based on the present disclosure. Therefore, such changes and modifications are to be understood as included within the scope of the present disclosure. For example, the functions and the like included in the various components may be reordered in any logically consistent way. Furthermore, components may be combined into one or divided.

The invention claimed is:
1. A detector for gas chromatography comprising:
a manifold;
a first bridge circuit; and
a second bridge circuit; wherein
the manifold has formed therein
  a first analysis flow path to which a first carrier gas including a predetermined component in a first analysis gas is to be supplied, and in which a first analysis resistive body is disposed;
  a first reference flow path to which the first carrier gas not including the predetermined component in the first analysis gas is to be supplied, and in which a first reference resistive body is disposed;
  a second analysis flow path to which a second carrier gas including a predetermined component in a second analysis gas is to be supplied, and in which a second analysis resistive body is disposed; and
  a second reference flow path to which the second carrier gas not including the predetermined component in the second analysis gas is to be supplied, and in which a second reference resistive body is disposed;
the first bridge circuit is configured to be capable of detecting the predetermined component in the first analysis gas using the first analysis resistive body and the first reference resistive body;
the second bridge circuit is configured to be capable of detecting the predetermined component in the second analysis gas using the second analysis resistive body and the second reference resistive body; and
a distance between the first analysis resistive body and the second reference resistive body is less than a distance between the first analysis resistive body and the second analysis resistive body.
2. The detector for gas chromatography of claim 1, wherein a distance between the second analysis resistive body and the first reference resistive body is less than a distance between the second analysis resistive body and the first analysis resistive body.

3. The detector for gas chromatography of claim 2, wherein a line connecting the first analysis resistive body and the first reference resistive body and a line connecting the second analysis resistive body and the second reference resistive body are parallel to each other.

4. The detector for gas chromatography of claim 3, wherein
- the first analysis flow path comprises an inlet and/or an outlet positioned between the first analysis resistive body and the second reference resistive body;
- the first reference flow path comprises an inlet and/or an outlet positioned between the first reference resistive body and the second analysis resistive body;
- the second analysis flow path comprises an inlet and/or an outlet positioned between the first reference resistive body and the second analysis resistive body;
- the second reference flow path comprises an inlet and/or an outlet positioned between the first analysis resistive body and the second reference resistive body; and
- a distance between the first analysis resistive body and the first reference resistive body is less than the distance between the first analysis resistive body and the second reference resistive body.

5. The detector for gas chromatography of claim 1, wherein at least one of a first analysis cell formed by the first analysis flow path and the first analysis resistive body, a first reference cell formed by the first reference flow path and the first reference resistive body, a second analysis cell formed by the second analysis flow path and the second analysis resistive body, and a second reference cell formed by the second reference flow path and the second reference resistive body is a semi-diffusion type cell.

* * * * *